UNITED STATES PATENT OFFICE.

CARLETON ELLIS, OF MONTCLAIR, NEW JERSEY.

ROAD-BED AND CONSTRUCTION THEREOF.

1,068,048. Specification of Letters Patent. Patented July 22, 1913.

No Drawing. Application filed December 7, 1912. Serial No. 735,393.

*To all whom it may concern:*

Be it known that I, CARLETON ELLIS, a citizen of the United States, and a resident of Montclair, in the county of Essex and State of New Jersey, have invented certain new and useful Improvements in Road-Beds and Construction Thereof, of which the following is a specification.

This invention relates to a method of treating road beds either to harden the surface and prevent to a considerable extent the formation of dust, or to form a hard, firm series of courses making up a roadbed, all as more fully hereinafter described.

My invention relates to the treatment of roads with the binding constituent of sulfite liquor.

It has been proposed to treat roads with sulfite liquor either dilute or concentrated to a solution of desired density.

My invention does not have to do with solutions of this character, but relates to the use of binding materials as sulfite waste liquor solids concentrated to a dry powder or otherwise put into non-liquid form etc. more particularly under conditions which give rise to a body showing certain reactive and other properties of a novel character as will be more fully hereinafter set forth.

In preparing the material for carrying out my invention, I take waste sulfite of cellulose liquor and concentrate it preferably after largely freeing it from lime or other materials which may tend to clog the concentrating apparatus. By this I do not mean that ordinarily I entirely remove all mineral bases which are present, but simply that preferably I endeavor to eliminate such portion as may be precipitated during concentration.

The liquid may be evaporated in the acid condition, or it may be first neutralized or made alkaline. None of these procedures, however, serve my purpose as well as what I call the step of producing a semi-acid compound, that is one, the normal acidity of which is reduced almost exactly one-half by the addition of lime or other basic material.

The concentration of the solution may be carried out with fully acid material and the semi-acid material subsequently prepared.

Instead of concentrating to a syrupy body of say 30° Baumé which is about the strength of the initial liquor used in the treatment of roads, I carry the concentration much further, removing preferably almost the entire content of water preferably in the presence of oxygen, so that oxygenation of the preferred semi-acid product occurs and produces a finely granular or pulverulent material which, although soluble in water, is normally not excessively soluble like ordinary sulfite liquor and which semi-acid oxidized material although originally soluble has the property of becoming more or less insoluble on protracted exposure to air and moisture in road beds without material loss of binding qualities.

In applying my product to the treatment of a road surface preferably I dust the surface with the finely granular or pulverulent product and then sprinkle the roadbed with water. As each granule of the binding material slowly dissolves, it forms a zone of concentrated liquor in the adjacent region, while this gradually tapers off to a weak solution or content of sulfite liquor which property often tends to prevent the heretofore experienced difficulty of crusting.

The binding material in dry form may be applied by means of a distributer attached to the front of an ordinary watering cart so that immediately after the road is dusted, the water is applied to bring about cementation. On the other hand very desirable results may be secured by dusting the road with the dry binder and rolling same before sprinkling. This secures a road surface of a somewhat different texture from that obtained when ordinary sulfite liquor is sprinkled on the surface.

It is well nigh impossible to roll into the surface the liquid sulfite liquor to afford the results which are obtained by rolling the dusted road surface in this manner which, of course, may be previously dampened if desired and then thoroughly sprinkling the road to bring about the final cementation.

Various kinds of apparatus may, of course, be used in distributing the powder over the road bed surface, any suitable powder distributing machine of standard type or otherwise being usually easily rendered adaptable to this use.

Another feature of my invention is that I may deliver a larger portion of the binder on that portion of the road where traffic is heaviest. A distributer may be provided which discharges a larger amount along the wheel track portion of the road. A roller may then follow to press this into the surface and on sprinkling the special effect desired is secured. It is obvious that the local application of liquids in this manner offers many difficulties which do not obtain with the dry binder.

Various additions may be made to the dry binder either during or after concentration to that form. After concentration to a thick material powdered quicklime sometimes may be added to absorb the moisture present and to afford a dry powder without further concentration.

All kinds of fillers such as talc, kieselguhr, fullers' earth and the like may be added to the partially concentrated liquor so as to form a nucleus during the concentration to dryness and also weight the particles so that the product may be applied in windy weather without loss.

An addition to the liquor is that of silicate of soda or its equivalent. The addition of 5 or 10% more or less of silicate of soda prior to final concentration yields a valuable product, in spite of the seeming exchange tending to bring about the formation of silicate of lime. It is however, just as feasible or better to mix the dry pulverized sulfite waste liquor solids with dry silicate of soda in powder form using about 5 to 10% of the latter more or less and dust the road with this mixture, subsequently sprinkling same.

In addition to the semi-acid oxidized material other binders derived from sulfite liquor may be employed, as also any equivalent substance and I do not limit myself herein to the precise materials or procedure employed, but may invoke the doctrine of equivalency in so far as same is herein applicable.

In making the road bed the road material may be mixed with dry binder in the proportion of say 1% or more according to the nature of the road material and the road built up course by course in the usual way, the number and character of the courses depending upon the degree of elaboration of the roadbed required. When the road is moistened, each particle of the binder furnishes a zone decreasing in concentration from the surface of the particle outward through the earthy mass and this form of distribution apparently prevents the trouble heretofore experienced in some instances of scaling and crusting.

Ordinary Portland cement or concrete mixture may receive additions of the dry binder and be worked up into a mortar in connection with the making of so-called cements or concrete road beds.

The water employed in moistening the roadbed may be charged with any suitable chemical such, for example, as chlorid of calcium or magnesium, sodium silicate, molasses and black strap or emulsions of oil. Similarly the road surface may be coated with bitumen or the road structure may be suitably impregnated with oil or bitumen and the like.

A feature of the present invention previously in part set forth is that the powdered binder may be distributed through the road soil so that the particles are separated more or less, but nevertheless are closely adjacent, and furnishing when moistened points of germination of sulfite liquor solution which diffuse away from these points or germinal centers of solution into the earth around about and furnish zones of decreasing concentration from the point of germination outwardly. Thus by having the particles closely adjacent, over-lapping zones of varying concentration may be secured and this irregularity of distribution often as stated tends to overcome the objection of crusting which has been heretofore experienced to some extent with sulfite waste liquor.

When oil is used as a surface coating if desired a quantity of the powdered sulfite waste liquor may be added thereto. Similarly if oil is incorporated with the courses of the road themselves, such oil may contain powdered or granular sulfite waste liquor. On the other hand, the sulfite waste liquor may contain oil or other waterproofing material such as calcium stearate and the like in order that the granules of the binder may be given a definite resistance to the solvent action of the water so that the particle or granule of the sulfite liquor remains for a long time in part undissolved, acting as a source of supply of sulfite liquor to the adjacent soil and thus enabling a continuance of effect which is not easily secured in any other way. The addition of 10 to 15% of petroleum oil such as asphaltic oil suffices to accomplish this result, yielding a product which affords high permanence even in the dampest climates. In normal climates 3 to 5% of oil or 1% or so of calcium stearate suffices to secure this effect. The oil may be added to the liquor after the latter has been concentrated to a thick syrup when the product may be reduced to dryness and pulverized.

What I claim is:—

1. The process of treating roads which comprises dusting over the surface thereof a binder comprising sulfite waste liquor solids in a dry form.

2. The process of treating road beds or road surfaces which comprises incorporating therewith a binder composed of dry sulfite waste liquor solids and a weighting material.

3. The process of treating road beds or road surfaces which comprises incorporating therewith a dry binder comprising sulfite waste liquor solids and in applying a greater quantity of said binder along the region of greatest tractive erosion.

4. The process of treating road beds or road surfaces which comprises incorporating therewith a binder comprising a substantially dry finely divided material comprising sulfite waste liquor solids and weighting material.

5. The process of treating road beds or road surfaces which comprises incorporating therewith a binder comprising a substantially dry finely divided material comprising sulfite waste liquor solids.

Signed at Montclair in the county of Essex and State of New Jersey, this 30th day of November, A. D. 1912.

CARLETON ELLIS.

Witnesses:
B. M. ELLIS,
F. CARBUTT.